United States Patent Office 3,235,629
Patented Feb. 15, 1966

3,235,629
SELECTIVE TRIALKYLPHOSPHITE
EXTRACTION PROCESS
William E. Jones, Lafayette, Ind., and Gene W. Kauffman, Denver, Colo., assignors to Shell Oil Company, New York, N.Y., a corporation of Delaware
No Drawing. Filed Jan. 30, 1963, Ser. No. 255,090
11 Claims. (Cl. 260—990)

This invention relates to an improved process for the preparation and recovery of trialkylphosphites.

It is well known that trialkyl phosphites can be prepared by the reaction of alcohols with a phosphorous halide, e.g. phosphorus trichloride or phosphorus tribromide, provided that the hydrogen halide formed during the reaction is removed substantially as fast as it is formed. Should the hydrogen halide not be removed, subsequent reaction of hydrogen halide with trialkyl phosphite lowers the yield of trialkyl phosphite through the formation of the corresponding dialkyl phosphite. Conventionally, a tertiary amine is employed to scavenge the hydrogen halide through the formation of an amine hydrohalide salt which does not react with the trialkyl phosphite at as rapid a rate as the free hydrogen halide. However, because such a reaction does occur, it is important to minimize the time during which the amine salt and the trialkyl phosphite are in contact, and thereby reduce product loss. This necessity is particularly important when the phosphite is to be recovered by a distillation process, for at elevated temperatures, the reaction of amine hydrohalide and trialkyl phosphite occurs at a substantial rate.

Older methods of preparing trialkyl phosphite employ tertiary amines whose hydrohalide salts are solids at reaction temperature. The great bulk of this solid—three moles of amine salt are produced for each mole of trialkyl phosphite—makes adequate stirring difficult. To overcome this problem, large amounts of diluent are added to maintain the reaction medium in the fluid state that is necessary for the intimate contact of reactants that is required for good conversion and satisfactory yields of product. The large volume of material thus obtained magnifies the already difficult problem of separating and purifying the desired product.

An improvement in trialkyl phosphite production is the use of tertiary amines whose hydrohalide salts are liquid at reaction temperatures. This minimizes difficulty in maintaining adequate contacting of reactants. Frequently, however, these liquid amine salts are partially or totally miscible with the trialkyl phosphite product. This may facilitate reaction by allowing a completely liquid system, but it makes prompt and efficient separation of the amine salt and the trialkyl phosphite even more important, in order to minimize their interreaction.

It is a principal object of this invention to provide an improved method of separating a trialkyl phosphite from amine hydrohalides resulting from the reaction of a phosphorous halide and an alcohol in the presence of a tertiary amine. It is a further object to provide a selective solvent extraction process for the above purpose that greatly reduces the amount of contaminating materials present in the desired trialkyl phosphite product. An additional object is to provide for the production of trialkyl phosphites, particularly lower trialkyl phosphites, in high yield through the incorporation of this selective extraction process into the over-all preparative procedure.

The objects of the invention are accomplished by selectively extracting the trialkyl phosphite from the other reaction products with a solvent that is selective for the trialkyl phosphite. It has been found that properly chosen reaction conditions and a properly chosen extraction solvent make possible the recovery of a trialkyl phosphite in a state remarkably free from contaminating materials and in high yields.

The trialkyl phosphites are prepared in a conventional manner, that is, by the reaction of a phosphorous halide with an alkanol in the presence of a tertiary amine.

As the process of the invention particularly relates to the production of lower trialkyl phosphites, i.e. those trialkyl phosphites in which each alkyl group is alkyl, $C_nH_{2n+1}$—, of from one to four carbon atoms, the alkanols $C_nH_{2n+1}OH$ used in their preparation are saturated monohydric aliphatic alcohols of from one to four carbon atoms. Illustrative of these alkanols are methanol, ethanol, propanol, isopropanol, butanol, sec-butanol and tert-butanol. Preferred alkanols are those having from one to three carbon atoms, and particularly preferred alkanol reactants have from two to three carbon atoms, i.e. ethanol, propanol and isopropanol. As the presence of moisture in the reactant alkanols would result in hydrolysis of the phosphorous halide reactant, it is preferred that the alkanols be anhydrous. Should there be moisture present, additional amounts of amine and phosphorous halide would be required.

The suitable phosphorous halides are those of halogens of atomic number from 17 to 35, the halogens, chlorine and bromine. The preferred halide is phosphorous trichloride.

The process of this invention is particularly designed for systems in which the amine hydrohalide is liquid at reaction temperature. The use of an amine whose hydrohalide is solid greatly increases the difficulty of handling, and offers no compensating advantages. It is further desirable that the amine salt and the trialkyl phosphite produced have sufficiently different solubility characteristics so that they may be separated by selective solvent extraction. The amines to be used are then hydrocarbon tertiary amines, including acyclic, alicyclic and heterocyclic and saturated and unsaturated, whose hydrohalide salts are liquid at the temperature at which the reaction is carried out. Thus they may be alkenylamines, e.g. triallylamine, alkylamines, e.g. triisooctylamine, heterocyclic amines, e.g. beta-picoline, cycloalkylamines, e.g. tricyclopentylamine, mixed amines such as dialkenylalkylamines, and the like. In the case of the trialkylamines they should have from five to ten carbon atoms in each alkyl group. Particularly preferred for its desirable properties is triallylamine.

In the preparation of the trialkyl phosphite, at least a stoichiometric amount of alkanol based upon the phosphorous halide is employed, that is, at least three moles of alkanol per mole of phosphorous halide. Preferably a slight excess of alkanol, from about one-half molar percent, to about five molar percent with about one percent being optimum in most cases, is used relative to the amount of phosphorous halide.

At least a stoichiometric amount of tertiary amine is also used, three moles of tertiary amine per mole of phosphorous halide. Although an excess of tertiary amine, as much as about sixty percent may be employed, such an excess is not necessary if adequate stirring is maintained, and to avoid unnecessary difficulties in separation it is desired that no large excess of tertiary amine be present. It is preferred to use a substantially stoichiometric amount of amine.

The reaction of alkanol with phosphorous halide may be conducted within a wide range of temperatures. The reaction may be carried out at temperatures as low as about −30° C. or as high as about 200° C. If the temperature selected is too low, however, the reaction mixture becomes quite viscous and adequate mixing is difficult to obtain. On the other hand, too high a temperature results in the decomposition of the amine hydrohalide and subsequent loss of product through undesired secondary reactions. In general, temperatures from about 0° C. to about 100° C. are satisfactory and are to be preferred with temperatures from about 15° C. to about 65° C. providing optimum reaction rates together with excellent conversions and high yields.

It is usually desirable to bring the reactants together gradually, as by adding one reactant to the other. Controlled addition has the further advantage of enabling a substantially constant temperature to be maintained. Although either reactant may be added to the other, it is preferred that the phosphorous halide be added to the alkanol, as the greater initial volume obtained by this mode of addition provides for more efficient moderation of temperature. The total amount of amine may be present at the outset of reaction, or the amine may be partially introduced before reaction begins and the remainder added during the course of the reaction. It may, for example, be introduced while serving as a solvent for the phosphorous halide reactant. In either case, sufficient amine must be present at all times to neutralize the hydrogen halide formed by the reaction of alkanol and phosphorous halide.

At the conclusion of reaction, the product mixture may consist of a single phase if the components are substantially miscible, or of two phases if they are not. In either case, prompt separation of the phosphite from the amine salt is a matter of importance, for continued contact results in conversion of the trialkyl phosphite to undesired dialkyl phosphite and a consequent lowering of product yield.

It has been found, however, that a selective extraction process may be employed to quickly and easily separate the trialkyl phosphite from the amine hydrohalide. It has been further found that through the use of a particular class of solvents, undesired byproducts such as dialkyl phosphite may be rejected along with the amine salt, and the resulting solution of trialkyl phosphite is remarkably free from contaminating materials. It may be used for further synthetic procedures by merely removing the bulk of the solvent by flash distillation or other conventional methods. Alternately, the trialkyl phosphite may be obtained as a pure material by careful fractionation.

The solvents that have been found to be satisfactory for the selective extraction process are aliphatic hydrocarbons and mixtures thereof, such as the alkanes, acylic and alicyclic, and the alkenes, acyclic and alicyclic which are liquid at the conditions of the reaction. These solvents have the property of dissolving the low molecular weight trialkyl phosphites but are not substantially miscible with the amine salts or other undesired reaction products. Within the preferred temperature range, solvents such as pentane, methylcyclopentane, cyclohexane, cyclohexene, hexane, hexene-2, heptane, octane, isooctane, 2,4,4-trimethylpenetene-1, nonane, decane, decahydronapthalene and the like or mixtures thereof may be utilized. Should superatmospheric pressure be applied to the system, butane would also be satisfactory. For ease of handling, solvents that have boiling points at atmospheric pressure that are higher than room temperature, i.e., 20–30° C., are preferred. It is further desired that the extraction solvent have a boiling point below that of the trialkyl phosphite being extracted, at least about 20° C. lower. The solvent can then be readily flashed to leave the phosphite as a reasonably pure bottoms product suitable for further synthetic operations. Aliphatic hydrocarbons that most satisfactorily meet these purposes are those saturated aliphatic hydrocarbons of from five to about 10 carbon atoms, with heptane being preferred.

The extraction solvent may be introduced into the system at any convenient time. In one modification of the procedure, the extraction solvent is added at the conclusion of the reaction. This results in the formation of a two phase system if two phases were not originally present. The upper (light) phase contains substantially all of the trialkyl phosphite and hydrocarbon and contains only minor amounts of other materials. Essentially all of the amine hydrohalide is rejected into the lower (heavy) phase. Unexpectedly, it was found that about 90% of the dialkyl phosphite, a major by-product, is also rejected into the lower phase. Upon standing, the two phases separate sufficiently, to permit separation by decantation, centrifugation or other suitable means.

Alternatively, the extraction solvents may be added at some other time, such as during the course of the reaction or before the reaction is begun. The presence of the extraction solvent during the reaction provides the advantage of separating the trialkyl phosphite from the amine hydrohalide as it is formed, thereby minimizing the undesired side reactions that result from continued contact of these materials. In the presence of the solvent, the system separates into two phases during the course of reaction, the upper phase containing the reactants and trialkyl phosphite product and the lower phase containing the amine salt and other rejected materials. As the trialkyl phosphite is separated from the materials with which it could react to produce by-products, the selectivity of the reaction is increased and the yield is improved.

The volume of extraction solvent used will depend upon the particular trialkyl phosphite and amine hydrohalide in the system. Use of too little solvent results in incomplete separation, while an excessive amount of solvent merely adds unnecessarily to the volume of the mixture without serving any useful purpose. It has been found that volume ratios of solvent to reactants from about 10 to 1 to about 1 to 5 are useful with ratios from 2 to 1 to about 1 to 2 being especially satisfactory. A volume ratio of solvent to reactants of about 1 to 1 is preferred.

After the solvent has been added and the reaction is complete, the phases are allowed to separate and the upper phase containing the trialkyl phosphite and the extraction solvent is removed. The time required for phase separation will vary from a few minutes to several hours, depending upon the composition of the particular phases being separated. The time required for effective phase separation can be reduced, however, through the use of centrifugation.

After the upper phase has been removed, the lower (amine salt) phase can again be selectively extracted with additional solvent. In this manner, additional trialkyl phosphite can be obtained. The extracts are then usually combined and flash distilled to remove the bulk of the solvent. The bottoms product may then be used as reactant for further synthetic applications or fractionated to obtain the trialkyl phosphite in a pure state. Following the above-described reaction procedure, extraction process and work up, yields of trialkyl phosphite in excess of 85% are customarily obtained.

The following examples are illustrative of the process of the invention. It should be understood that they are not to be regarded as limitations on the invention, since variations may be made as will be understood by one skilled in this art.

EXAMPLE I

A crude reaction mixture was obtained by reacting 139.6 g. of anhydrous ethanol with 137.4 g. of phosphorus trichloride at 25° C. in the presence of 424.8 g. of triallylamine. A portion of the crude reaction mixture was then extracted at 25° C. with an approximately equal volume of heptane. The composition of the reaction mixture and the compositions resulting from its extraction are shown in Table I.

*Table I*

|  | Reaction Mix., g. | Light Phase, g. | Heavy Phase, g. | Percent w. Recovery in Light Phase of Initial Mixture |
| --- | --- | --- | --- | --- |
| Triethyl Phosphite | 44.9 | 40.7 | 4.4 | 90.6 |
| Diethyl Phosphite | 3.1 | 0.3 | 2.8 | 9.7 |
| Triallylamine | | 2.3 | | |
| Triallylamine·HCl | 170.8 | Trace | 168.0 | |
| Heptane | 159.4 | 154.2 | | 96.8 |

The heavy phase resulting from the extraction shown in Table I was extracted again with heptane. The results are shown in Table II.

*Table II*

|  | Charge, g. | Light Phase, g. | Heavy Phase, g. | Percent w. Recovery in Light Phase of Initial Mixture |
| --- | --- | --- | --- | --- |
| Triethyl Phosphite | 4.4 | 3.7 | 0.5 | 8.2 |
| Diethyl Phosphite | 2.8 | 0.3 | 2.4 | 9.7 |
| Triallylamine·HCl | 166.8 | | 163.7 | |
| Triallylamine | | 0.3 | | |
| Heptane | | 159.4 | 153.5 | |

Thus, by the extraction process over 98% of the triethyl phosphite is recovered from a crude reaction mixture. The combined extract, free of solvent, would contain about 93% triethyl phosphite.

EXAMPLE II

The reaction of anhydrous ethanol with phosphorus trichloride was conducted in the presence of triallylamine. A volume of heptane was added before the start of reaction that was equal to about one-half the volume of reactants. When the reaction was complete, the phases were separated and the heavy phase extracted again with an equal volume of heptane. Distillation of solvent following the combination of extracts showed the yield of triethyl phosphite to be 88% based upon phosphorus trichloride.

EXAMPLE III

A reaction similar to that of Example II was performed using a initial volume of heptane equal to the volume of the reactants. Following reaction, the phases were allowed to stand for 15 minutes at which time it was determined that 86% of the triethyl phosphite was present in the light phase. This amount was increased to 92% by centrifuging the two phases for about 15 minutes at 2400 r.p.m. before separation. The yield of triethyl phosphite obtained by the work-up described in Example II was 89%.

EXAMPLE IV

Isopropyl alcohol is reacted with phosphorus trichloride in the presence of a stoichiometric amount of triallylamine and a volume of heptane equal to the total volume of the reactants. Following reaction and phase separation, a good yield of triisopropyl phosphite is obtained upon fractionation of the combined heptane phase and the heptane extraction of the triallylamine hydrochloride (heavy) phase.

EXAMPLE V

Phosphorus tribromide is reacted with anhydrous n-butanol in the presence of trihexylamine as a hydrogen acceptor. Extraction with isooctane gives an efficient separation and following work-up a good yield of tributyl phosphite is obtained.

EXAMPLE VI

Following the procedure of Example IV, anhydrous methanol is reacted with phosphorus trichloride in the presence of triamylamine. A good yield of trimethyl phosphite is obtained from fractionation of the combined extracts.

We claim as our invention:

1. The process of selectively extracting a trialkyl phosphite from a mixture obtained by reaction of anhydrous alkanol of from 1 to 4 carbon atoms and a phosphorus halide of a halogen of an atomic number from 17 to 35, in the presence of a hydrocarbon tertiary amine whose hydrohalide salt is liquid at reaction temperature, comprising dissolving said trialkyl phosphite in a selective extraction solvent, said extraction solvent being an aliphatic saturated hydrocarbon having from 5 to 10 carbon atoms and the volume ratio of said solvent to said mixture being from about 10:1 to about 1:5, and separating the resulting extract comprising said trialkyl phosphite and said selective extraction solvent from the resulting raffinate.

2. The process of claim 1 wherein the volume ratio of said solvent to said mixture is from about 2:1 to about 1:2.

3. The process of claim 1 wherein the extraction solvent is present during the reaction.

4. The process of obtaining a trialkyl phosphite by reacting anhydrous alkanol of from 1 to 4 carbon atoms with a phosphorus halide of a halogen of atomic number from 17 to 35, in the presence of a hydrocarbon tertiary amine whose hydrohalide salt is liquid at reaction temperature, selectively extracting said trialkyl phosphite from the reaction mixture by dissolving said trialkyl phosphite in an extraction solvent, said solvent being an aliphatic saturated hydrocarbon of from 5 to 10 carbon atoms and the volume ratio of said solvent to said mixture being from about 2:1 to about 1:2, separating the resulting extract comprising said trialkyl phosphite and said selective extraction solvent from the resulting raffinate, and removing said extraction solvent from the extract in the vapor phase.

5. The process of claim 4 wherein the trialkyl phosphite is triethyl phosphite.

6. The process of claim 4 wherein the trialkyl phosphite is triisopropyl phosphite.

7. The process of claim 4 wherein the phosphorous halide is phosphorus trichloride.

8. The process of claim 4 wherein the phosphorous halide is phosphorus tribromide.

9. The process of claim 4 wherein the extraction solvent is heptane.

10. The process of claim 4 wherein the tertiary amine is triallylamine.

11. The process of claim 4 wherein the tertiary amine is triisooctylamine.

(References on following page)

References Cited by the Examiner

UNITED STATES PATENTS

| | | | |
|---|---|---|---|
| 2,152,163 | 3/1939 | Tulleners | 260—461 X |
| 2,624,750 | 1/1953 | Pechukas | 260—461 |
| 2,658,909 | 11/1953 | Crandall et al. | 260—461 |
| 2,865,942 | 12/1958 | Chadwick et al. | 260—461 |
| 2,905,705 | 9/1959 | Kohler et al. | 260—461 |
| 3,068,267 | 12/1962 | Beck et al. | 260—461 |
| 3,068,269 | 12/1962 | Streich et al. | 260—461 |

CHARLES B. PARKER, *Primary Examiner.*

IRVING MARCUS, *Examiner.*

FRANK SIKORA, *Assistant Examiner.*